UNITED STATES PATENT OFFICE.

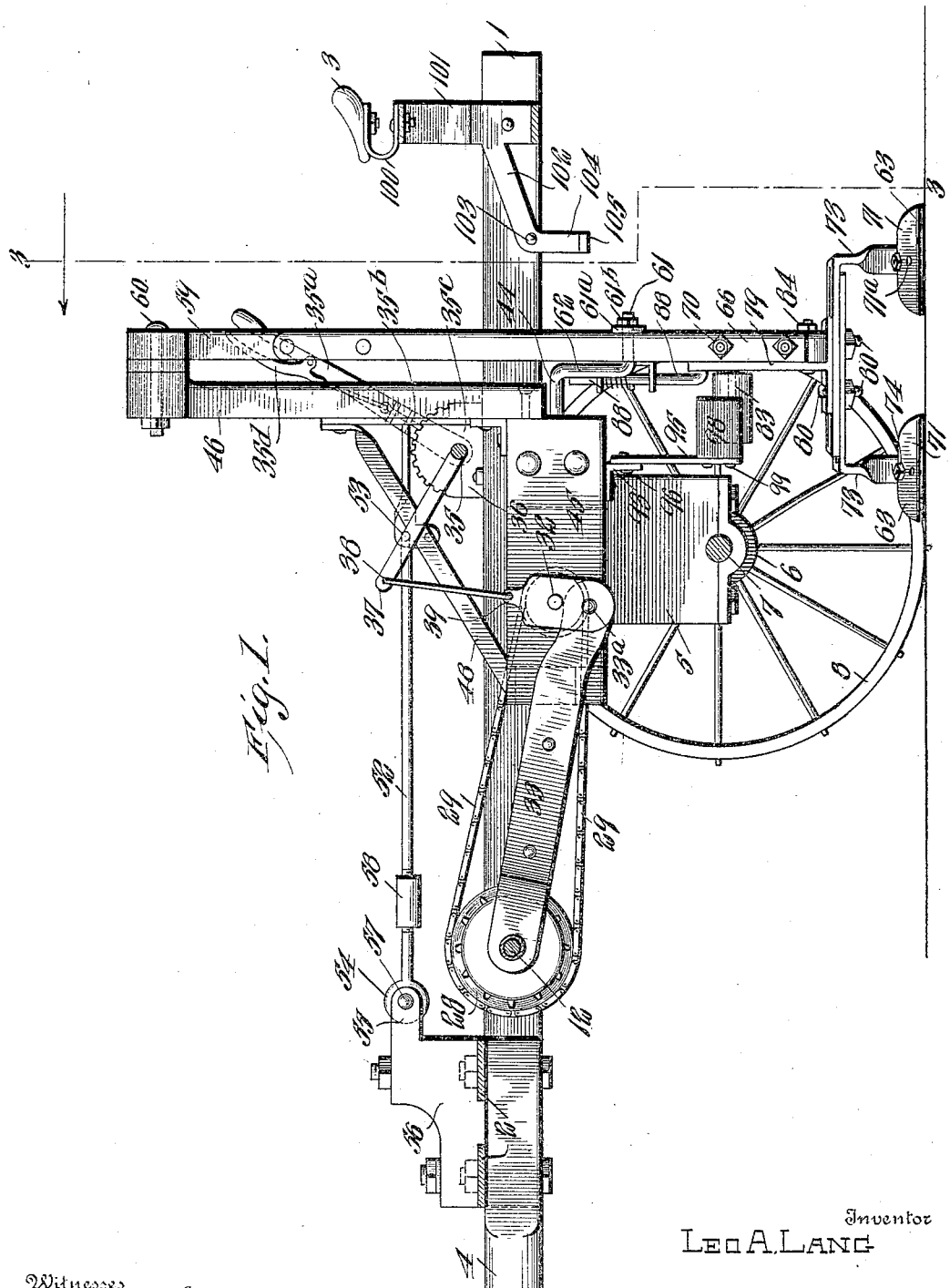

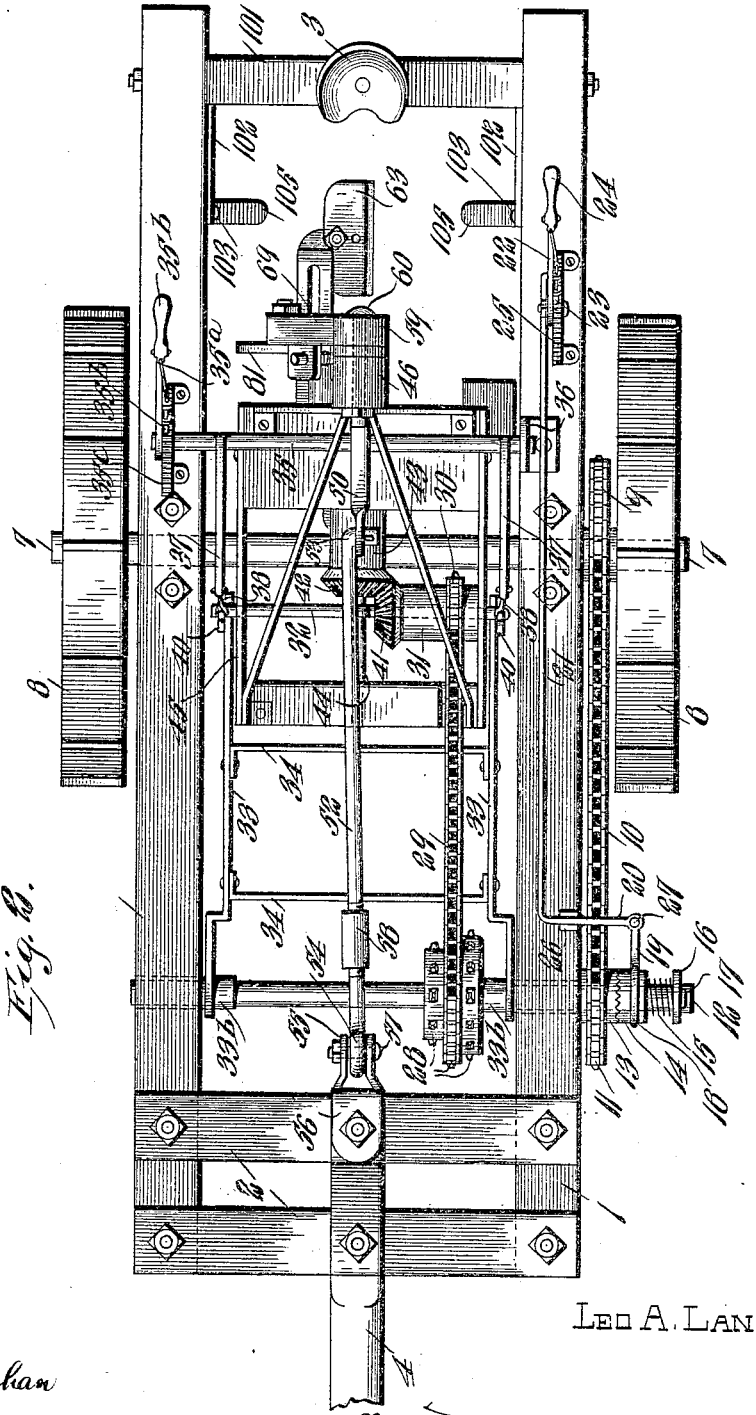

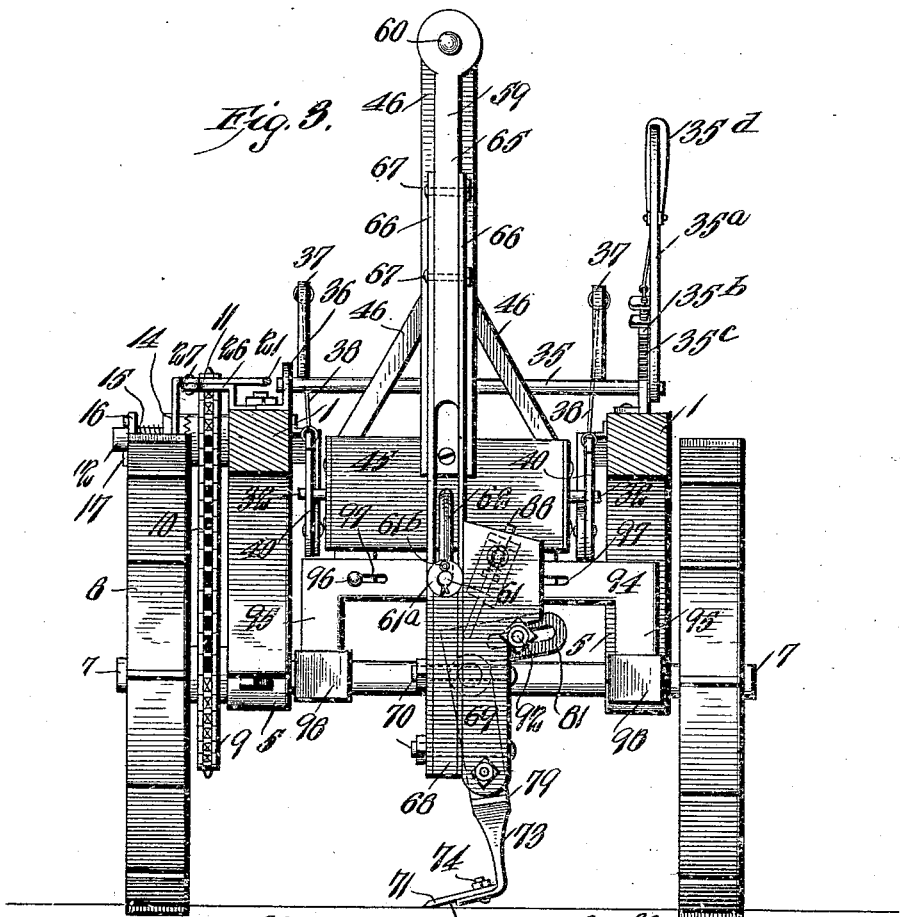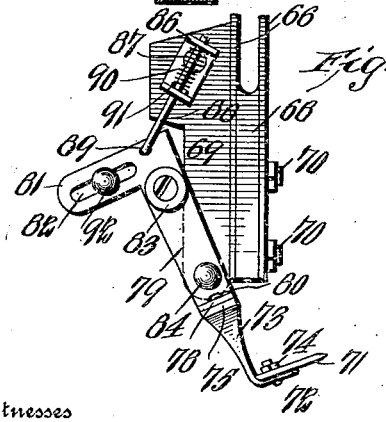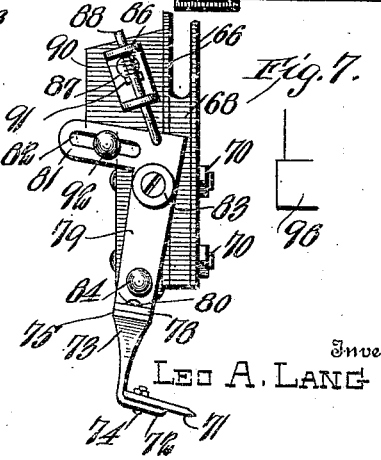

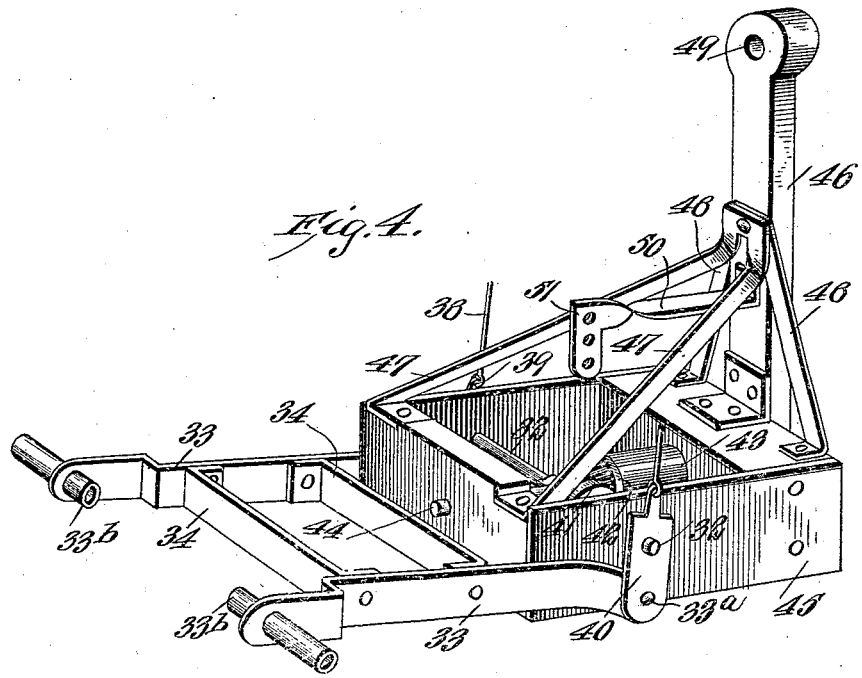
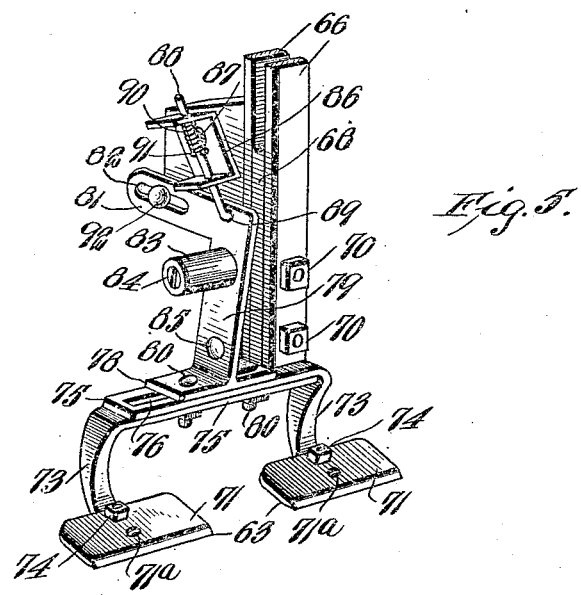

LEO ALBERT LANG, OF SOUTHMAYD, TEXAS.

COTTON-CHOPPER.

955,085.

Specification of Letters Patent.　　Patented Apr. 12, 1910.

Application filed April 29, 1909.　Serial No. 492,835.

*To all whom it may concern:*

Be it known that I, LEO ALBERT LANG, a citizen of the United States, and a resident of Southmayd, in the county of Grayson and State of Texas, have invented certain new and useful Improvements in Cotton-Choppers, of which the following is a specification.

My invention is an improvement in cotton choppers, and consists in certain novel constructions and combinations of parts hereinafter described and claimed.

Referring to the drawings forming a part hereof: Figure 1 is a longitudinal section; Fig. 2 is a plan view; Fig. 3 is a rear view; Fig. 4 is a perspective view of the swinging and auxiliary frames; Fig. 5 is a similar view of the hoes and their connection; Fig. 6 is a side view of the hoes in one position; and Fig. 7 is a similar view showing them in another position.

The present embodiment of the invention comprises a frame composed of side bars 1 connected by cross bars or plates 2, upon the one of which is a seat 3, and a tongue 4 is connected with the two front plates. The side bars 1 are provided at approximately their centers with blocks 5 having bearings 6 in which is journaled a shaft 7, provided at each end with a wheel 8. The shaft 7 has secured thereto, between one of the wheels and the frame, a sprocket wheel 9, connected by a chain 10, with a sprocket wheel 11, loosely mounted on a counter shaft 12, journaled in the side bars. The edge of the hub 13 of the sprocket wheel 11 is provided with clutch teeth, which are adapted to engage with clutch teeth on a sleeve 14, keyed to the shaft and slidable thereon, and normally retained in engagement with the hub by a spring 15, arranged between the sleeve and a collar 16 secured on the shaft by a pin 17. The sleeve 14 is provided with an annular groove, in which engage the arms 18 of a fork 19, integral with the angular portion 20 of a rod 21, which is connected to a lever 22, pivoted on one of the side bars, and provided with a spring actuated tooth 23 operated by a grip 24, pivoted to the lever, and engaging a toothed quadrant 25 on the adjacent side bar. The lever is pivoted to a bracket 26 on the side bar, as at 27. By means of the lever the sleeve may be released from the hub, as will be evident from the description.

A plurality of sprocket wheels 28 of different diameters is secured to the counter shaft between the side bars, and a sprocket chain 29 connects one of the wheels with a sprocket wheel 30 on the hub 31 of a shaft 32, journaled in plates 40, pivoted to the ends of spaced arms 33, as at 33$^a$, which arms are provided with hubs 33$^b$ mounted for swinging movement on the counter shaft and in the side bars 1, and are connected by cross bars 34 to form a swinging frame.

A shaft 35 is journaled in bearings 36 on the side bars of the main frame, and is provided with spaced parallel projecting arms 37, which are connected by links 38 on the ends of the arms with perforated ears 39 on plates 40, as shown in Fig. 1. A lever 35$^a$ is secured to the shaft 35, and is provided with a spring actuated tooth 35$^b$ engaging a toothed quadrant 35$^c$ integral with one of the bearings, and the tooth is operated by a grip 35$^d$ pivoted to the lever. The hub 31 is provided with a bevel gear 41, in mesh with a bevel gear 42 on the hub 43 of a longitudinal shaft 44, which is journaled in a substantially rectangular auxiliary frame 45 mounted between the arms 33 before described and having bearings for receiving the shaft 32. The frame 45 is provided at the rear end with a standard 46 braced to the frame by pairs of braces 47 and 48. A bearing 49 is arranged at the upper end of the standard. At near its center it is provided with a bracket 50 having at its free end a clevis 51.

A rod 52 is provided with an angular portion 53 for engaging one of the perforations of the clevis, and the other end of the rod is provided with an eye 54, which is received between the spaced ears 55 of a bracket block 56 connected with the end of the tongue and the cross bars 2, and a bolt 57 traverses the ears and the eye for securing the parts together. The rod is in two sections, as will be evident from an inspection of Fig. 1, and the ends of the sections are threaded and engaged by a threaded sleeve 58, to form a turnbuckle for adjusting the length of the rod.

A swinging arm 59 is pivoted by its upper end on a bolt 60 passing through an opening in the arm and the bearing 49, and somewhat below its longitudinal center the arm is provided with an opening for receiving the crank pin 61 of a crank 62 on the rear end of the longitudinal shaft 44, and the lower end of the arm is provided with a plurality of hoes 63. The arm 59 is composed of a body portion 65, having secured to each side thereof a plate 66 by bolts 67, which plates extend below the end of the body portion. A block 68 is arranged between the arms at their lower ends, and a bracket block 69 is arranged outside of one plate, and the plates and blocks are connected by bolts 70. The space between the end of the body portion and the block 68 forms a slot for receiving the crank pin, and a washer 61$^a$ is arranged on the crank pin for engaging the arm and is secured in place by a nut 61$^b$. Each hoe consists of a blade 71 provided with a plurality of openings 71$^a$, through one of which passes a bolt 74, connecting the blade with the angular portion 72 of a shank 73. Each shank is provided with a lateral arm 75, which is longitudinally slotted, as at 76, and the foot 78 of a plate 79 is provided with openings registering with the slots. Bolts 80 pass through each opening and the slot registering therewith for securing the parts together, and it will be evident from the description that the hoes may be adjusted toward and from each other by loosening the bolts. The plate 79 is provided with an angular portion 81 having a longitudinal slot 82, and with a roller 83 journaled on a screw 84, and is pivoted to the bracket block, as at 85.

A bracket 86 is pivoted to the bracket block, as at 87, and a link 88 is slidable through spaced bearings on the bracket, one end of the link having an angular portion engaging an opening in the plate 79, as at 89, and a spring 90 is arranged between one of the bearings and a transverse pin 91 in the link, the spring normally acting to move the link toward the plate 79. A stop pin 92 is adjustable in the slot 82, and is adapted to engage the bracket block to limit the swinging of the plate 79.

An angular bracket 93 is secured to each side of the auxiliary frame 45 near its rear end, and a yoke 94 provided at each end with an arm 95 is secured to the angular brackets by means of bolts 96 which pass through slots 97 and registering openings in the angular brackets, so that the yoke may be adjusted transversely of the auxiliary frame. A block 98 is secured to each arm by bolts 99, and the roller 83 is adapted to engage one of the blocks at each end of the swinging movement of the arm 59, to change the position of the plate 79 from that shown in Figs. 3 and 7 to that shown in Fig. 6.

In operation the machine is moved through the field with a wheel on each side of the cotton row. When in position the clutch sleeve is released, thus coupling the operating means for the swinging arm with the wheels. The arm 59 is swung transversely of the row. At each forward stroke the hoes are in the position shown in Fig. 3. At the end of the stroke the roller 83 engages the block 98 at the left of the machine, and the plate is swung into the position shown in Fig. 6, and the hoes pass over the plants on the return stroke. At the end of the return stroke the roller engages the other block and the hoes are returned to the position shown in Figs. 3 and 7, that is, to operative position. It will be evident that the position of the hoes is changed at the end of each stroke, and the spring and link mechanism retains them in position until the roller again meets a block. The adjustable stop pin 92 may be adjusted to vary the extent in the change of position.

By means of the lever 35$^a$ the swinging frame and with it the swinging arm and the hoes may be lifted clear of the ground, or adjusted to engage the plants, whether they are above or below the plane upon which the wheels travel.

It will be evident that the hoes may be adjusted toward and from each other to leave the standing plants nearer together or farther apart, and by changing the chain 29 to different sprocket wheels 28 the speed of the swinging arm may be varied. For this purpose the sprocket wheel 30 is slidable on the hub.

The seat 3 is secured to one end of a spring plate 100, whose other end is connected with an arched plate 101, which may be integral with the rear cross bar 2, and the plate is provided with a forwardly extending brace 102, at each end, and connected with the adjacent side bar, as at 103, and each brace is provided with a depending portion 104, and each depending portion is provided with a lateral integral foot plate 105.

The connection between the tongue and the standard, is so related to the double pivotal connection of the auxiliary frame with the main frame, at 33$^a$ and on the shaft 32, as to maintain the standard in a vertical position regardless of the position of the auxiliary frame, when the said frame is raised or lowered. When the said frame is lowered, the link 52 is practically shortened, since the end which is pivoted on the bolt 57 is moved downward when the frame is lowered and moved upward when the frame is elevated, thus practically shortening the length, since the parts 55 and 52 are moved out of direct alinement.

Having thus described my invention, what I claim as new and desire to secure by Letters Patent is:

1. A cotton chopper, comprising a frame, a shaft journaled thereon, wheels secured to the shaft, a counter shaft journaled on the frame, means for connecting and disconnecting the power shaft and the counter shaft, a frame mounted by one end for swinging movement on the counter shaft, means connected with the other end for swinging the frame, a shaft journaled in the free end of the swinging frame and having a driving connection with the counter shaft, an auxiliary frame journaled on the shaft of the swinging frame, a standard on the auxiliary frame, a shaft journaled longitudinally of the auxiliary frame and having a driving connection with the shaft of the swinging frame, said longitudinal shaft extending beyond the auxiliary frame and having a crank arm outside of the frame, a transversely swinging arm pivoted to the standard and provided with a longitudinal slot for receiving the crank arm, a plurality of hoes secured to the lower end of the arm, means for adjusting the hoes toward and from each other, and means for changing the angle of the shanks of the hoes with the swinging arm at the end of the movement thereof in each direction, for the purpose set forth.

2. A cotton chopper, comprising a wheel supported main frame, a swinging frame pivoted by one end to the main frame, means for swinging the frame, an auxiliary frame supported in the free end of the swinging frame, a shaft journaled longitudinally of the auxiliary frame and provided with a crank arm, a driving connection between said shaft and the wheels of the frame, a standard on the auxiliary frame, an arm pivoted to the standard and swinging transversely of the main frame and provided with a slot for engagement by the crank arm, a plurality of hoes connected with the lower end of the arm, means for adjusting the hoes toward and from each other, and means for changing the angle of the shanks of the hoes with the swinging arm at the end of its movement in each direction, for the purpose set forth.

3. A cotton chopper, comprising a wheel supported main frame, a swinging frame pivoted by one end to the main frame, means for swinging the frame, an auxiliary frame supported in the free end of the swinging frame, a shaft journaled longitudinally of the auxiliary frame and provided with a crank arm, a driving connection between said shaft and the wheels of the frame, a standard on the auxiliary frame, an arm pivoted to the standard and swinging transversely of the main frame and provided with a slot for engagement by the crank arm, a plurality of hoes connected with the lower end of the arm, and means for adjusting the hoes toward and from each other.

4. A cotton chopper, comprising a wheel supported main frame, a swinging frame pivoted by one end to the main frame, means for swinging the frame, an auxiliary frame supported in the free end of the swinging frame, a shaft journaled longitudinally of the auxiliary frame and provided with a crank arm, a driving connection between said shaft and the wheels of the frame, a standard on the auxiliary frame, an arm pivoted to the standard and swinging transversely of the main frame and provided with a slot for engagement by the crank arm, and a plurality of hoes connected with the lower end of the arm.

5. A cotton chopper, comprising a wheel supported frame, a swinging frame pivoted by one end to the main frame, a shaft arranged longitudinally of the swinging frame and supported thereby, said shaft having a crank arm, a driving connection between said shaft and the wheels of the frame, a standard supported by the swinging frame, an arm pivoted to the standard and having a slot engaged by the crank arm, a plurality of hoes connected with the arm, means for adjusting the hoes toward and from each other, and means for changing the position of the hoes at the end of the movement of the arm in each direction, for the purpose set forth.

6. In a cotton chopper, a frame, a swinging arm thereon, and a plurality of hoes connected with the arm, each of said hoes comprising a shank having at its lower end an angular portion and at its upper end a longitudinally slotted lateral arm, the arms of the respective shanks being superimposed, a blade secured to the angular portion of each shank, a plate having a transverse foot provided with openings registering with the slots, bolts traversing the openings and slot, said plate being pivoted to the arm and being provided with a longitudinally slotted angular portion, a stop pin adjustable in the slot for engaging the swinging arm, a bracket pivoted to the swinging arm and provided with spaced bearings, a link slidable in the bearings and having an angular portion, the plate having an opening for engagement thereby, a spring normally pressing the link toward the plate, a roller on the plate, a yoke adjustable transversely of the frame, and provided with a depending arm at each end thereof, and with blocks on the arms for engagement by the roller to change the position of the hoes, for the purpose set forth.

7. In a cotton chopper, a swinging arm, and a plurality of hoes connected therewith, each of said hoes comprising a shank having at its lower end an angular portion and at its upper end a longitudinally slotted lateral arm, the arms of the respective shanks being superimposed, a blade secured to the angular portion of each shank, a plate having a transverse foot provided with openings registering with the slots, bolts traversing the openings and slots, said plate being pivoted to the arm, means engaging the plate at the end of the movement of the swinging arm for changing the position of the hoes for the purpose set forth, a spring for retaining the arm in position, and means for limiting the movement of the arm.

8. In a cotton chopper, a swinging arm, and a plurality of hoes connected therewith, each of said hoes comprising a shank having at its lower end an angular portion and at its upper end a longitudinally slotted lateral arm, the arms of the respective shanks being superimposed, a blade secured to the angular portion of each shank, a plate having a transverse foot provided with openings registering with the slots, and bolts traversing the openings and slots, said plate being pivoted to the arm.

9. In a cotton chopper, a plurality of hoes, each comprising a shank having at one end a lateral arm, the arms being superimposed and provided with longitudinal registering slots, means engaging the slots for securing the shanks in adjusted relation, and a blade secured to the other end of each shank, said blade having a plurality of openings and the shank an opening for registering therewith and securing means traversing the registering openings.

10. In a cotton chopper, a swinging arm, a plate pivoted thereto, a hoe connected with one end of the plate, said plate having at the opposite end an angular portion provided with a longitudinal slot, and being provided at the junction of the angular portion therewith with an opening, a bracket provided with spaced bearings pivoted to the arm, a link slidable in the bearings and having an angular portion engaging the opening, a spring pressing the link toward the plate, a stop pin for engaging the arm adjustable in the slot, and means engaging the plate at the end of travel of the swinging arm in each direction for changing the position of the hoes, for the purpose set forth.

11. In a cotton chopper, a swinging arm, a plate pivoted thereto, a hoe connected with one end of the plate, said plate having at the opposite end an angular portion provided with a longitudinal slot, a link mounted for lateral swinging and for sliding movement on the arm and connected with the plate, a spring pressing the link toward the plate, a stop pin adjustable in the slot, and means engaging the plate at the end of each swinging movement, to change the position of the hoe, for the purpose set forth.

12. In a cotton chopper, a swinging arm, a plate pivoted thereto, a hoe connected with one end of the plate, said plate having at the opposite end an angular portion provided with a longitudinal slot, a link mounted for lateral swinging and for sliding movement on the arm, and connected with the plate, yielding means for restraining the sliding movement of the link, a stop pin adjustable in the slot for engaging the arm, and means engaging the plate at the end of each swinging movement for swinging the same.

13. In a cotton chopper, a swinging arm, a plate pivoted thereto, hoes connected with one end of the plate, the plate having an angular portion at its opposite end, a link mounted for lateral swinging and for sliding movement on the arm, yielding means for restraining the sliding movement of the link, and a stop adjustably mounted on the angular portion for engaging the arm.

14. In a cotton chopper, a swinging arm, a plate pivoted thereto, hoes connected with one end of the plate, the plate having an angular portion at its opposite end, yielding means for restraining the movement of the plate with respect to the arm, a stop adjustable on the angular portion for engaging the arm, and means for swinging the plate at the end of the movement of the arm in each direction, for the purpose set forth.

15. In a cotton chopper, a swinging arm, a plate pivoted thereto, substantially horizontal hoes connected with the plate, means for swinging the plate at the end of each movement of the arm whereby to vary the angle of said hoes with respect to the ground, yielding means for retaining the plate in position with respect to the arm, and means for limiting said movement of the plate.

16. In a cotton chopper, a swinging arm, a plate pivoted thereto, substantially horizontal hoes connected with the plate, means for swinging the plate at the end of each movement of the arm whereby to vary the angle of said hoes with respect to the ground, and yielding means for retaining the plate in position with respect to the arm.

17. In a cotton chopper, a swinging arm, a plate pivoted thereto, substantially horizontal hoes connected with the plate, means for swinging the plate at the end of each movement of the arm whereby to vary the angle of said hoes with respect to the ground, and means for limiting the movement of the plate with respect to the arm.

18. In a cotton chopper a main frame, an auxiliary frame mounted to swing thereon, a standard on the auxiliary frame, hoeing mechanism supported by the standard, means for swinging the frame, a tongue, a bracket on the tongue having a rearwardly extending angular portion, a link connecting the standard with said portion, and a turnbuckle interposed in the link.

19. In a cotton chopper a main frame, an auxiliary frame mounted to swing thereon, a standard on the auxiliary frame, hoeing mechanism supported by the standard, means for swinging the frame, a tongue, a bracket on the tongue having a rearwardly extending angular portion, and a link connecting the standard with said portion.

20. In a cotton chopper a main frame, an auxiliary frame mounted to swing thereon, a standard on the auxiliary frame, hoeing mechanism supported by the standard, means for swinging the frame, a tongue, and means connecting the tongue and the standard for retaining said standard in vertical position regardless of the position of the auxiliary frame.

21. In a cotton chopper a main frame, an auxiliary frame mounted to swing thereon, a standard on the auxiliary frame, hoeing mechanism supported by the standard, means for swinging the auxiliary frame, and means operated by the swinging of the auxiliary frame for retaining the standard in vertical position regardless of the position of the swinging frame.

LEO ALBERT LANG.

Witnesses:
S. A. MOORE,
Q. S. DICKINSON.